June 25, 1968   N. M. BROWN   3,389,875
WIRE PAYOUT SYSTEM FOR MEASURING A SHIP'S GROUND SPEED
Filed June 17, 1966   2 Sheets-Sheet 1

INVENTOR
N. M. BROWN
BY
ATTORNEY

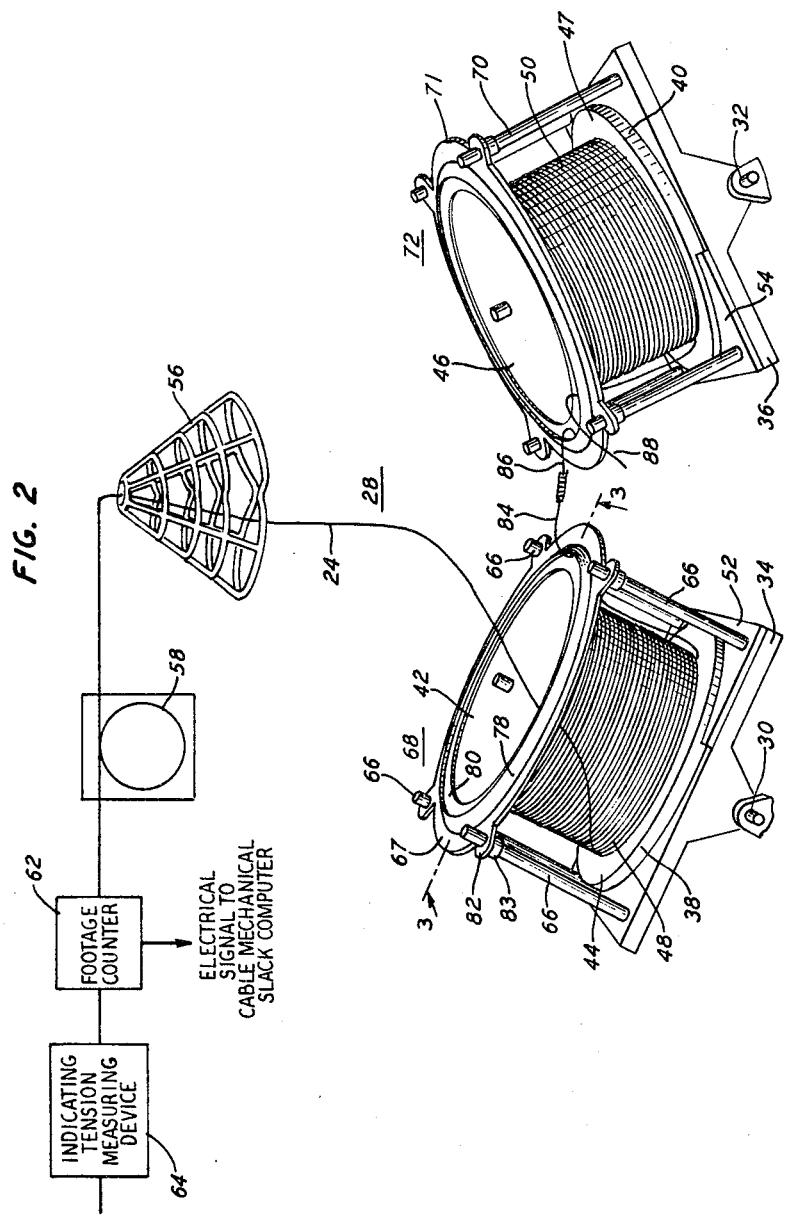

United States Patent Office 3,389,875
Patented June 25, 1968

3,389,875
WIRE PAYOUT SYSTEM FOR MEASURING A SHIP'S GROUND SPEED
Neil M. Brown, Belford, N.J., assignor to Bell Telephone Laboratories, Incorporated, Murray Hill and Berkeley Heights, N.J., a corporation of New York
Filed June 17, 1966, Ser. No. 558,513
7 Claims. (Cl. 242—128)

ABSTRACT OF THE DISCLOSURE

On a ship, taut wire is passed over a sheave and overboard by drawing it axially over the flange of a spool about which the wire is wound. To prevent the springy wire from uncoiling too fast and kinking as it is drawn over the flange, the wire passes between the spool's end flange and an elastic ring embracing the flange. As it is drawn the wire moves peripherally around the flange. The bitter end of the wire on the spool also passes between the flange and ring. It is joined to the wire of a successive waiting spool. The leading end and bitter end of the second spool also pass through an elastic ring embracing its end flange. This prevents kinking and breaking of the wire.

---

This invention relates to ocean cable-laying equipment, and particularly to systems that continuously pay out wire from a moving cable ship while recording the amount payed out to measure the ship's ground speed and to control the amount of cable payed out.

In such equipment the movement of the ship from a stationary anchor holding an end of the wire furnishes the power for pulling the wire off a spool. A sheave holds the wire taut as it travels overboard. A recorder measures the length of wire payed out. It continuously computes the ground speed and controls the amount of cable to be payed out.

Rather than accepting the disadvantages and dangers inherent in drawing the wire off the spool tangentially and turning the usually high-inertial spool, the wire is generally drawn over the end of a fixed upstanding spool. The bitter or tail end of each spool is tied to the leading end of a spool waiting to be unwound.

Drawing the wire over the end of the spool leaves the wire free to uncoil. Because wire on such a spool is extremely springy to withstand tension, it uncoils quite readily and lays about the spool. Drawing such uncoiled wire often causes kinking. When the kinks pass the sheave where the wire is drawn taut, they form weaknesses in the wire. Failure often results thereby rendering continuous accurate measurement of ground speed impossible.

In some equipment this kinking has been avoided by passing the wire through a pulley mounted at the end of a flyer arm rotating above the spool's end. By restraining the arm's rotation, the rate at which the spool uncoils is restricted. However, such rotating arm devices are needlessly complex. They inject a high inertia. This may break the wire when the operating speed changes suddenly. Their movements create hazards to workmen. Also, spool transfer from one spool to another for continuous wire payout is complex and requires attendants at these times.

An object of this invention is to improve shipboard cable-laying equipment.

Another object is to improve means for paying out springy wire, particularly while avoiding the above deficiencies.

Still another object of the invention is to assure continuous paying out of taut, springy wire while avoiding dangerous kinks.

Yet another object of the invention is to pay out springy wire from a spool particularly for cable-laying purposes and specifically while securing freedom from kinks, swinging arms and resulting failures.

Another object of the invention is to accomplish the before-mentioned, while assuring smooth changeover from an operating spool to a waiting spool without the need for attendants at this time.

According to a feature of the invention, these ends are achieved in part by paying wire overboard, after holding it taut and counting the length payed out, while drawing the wire off the spool axially and embracing the wire traveling off the spool between two resiliently-engaging surfaces that form a frictional annular path at the end of the spool. These surfaces restrain the wire. As the wire is drawn off it travels longitudinally, and also laterally around the circular frictional path, but only in accordance with the speed with which it is drawn off. No extra wire becomes sufficiently loosened to uncoil.

Continuity of payout is maintained with subsequent spools by passing the bitter end of the spool between the engaging surfaces and tying it to the leading edge of a subsequent spool of wire whose wire ends are similarly embraced by such surfaces. Interference between the respective ends of the same wire is avoided by constraining the leading end of the wire to travel on the inside of the bitter end as it passes the bitter end in the frictional path.

By virtue of the invention, as the wire is drawn off, it uncoils without kinking and permits automatic transfer to the next waiting spool. New spools can replace unwound spools and their ends tied with the bitter end of the operating spool or unwinding spool after being embraced by the frictional surfaces.

Preferably, the surfaces are formed by a steel rim mounted at the periphery of each spool's upper end flange and by a flat resilient ring pressed against the steel ring.

According to another feature of the invention, the spools are tilted so their axes converge. A hopper at the axial intersection guides the wire unwinding from the spool. Suitable rods on each tilting platform guide the resilient ring onto the steel rim in this configuration. By virtue of this feature, simpler transfer between spools is achieved.

These and other features of the invention are pointed out in the claims. Other objects and advantages of the invention will be understood from the following detailed description when read in light of the accompanying drawings wherein:

FIG. 2 is a perspective diagram illustrating details of the taut wire payout system in FIG. 1.

Figure 1:
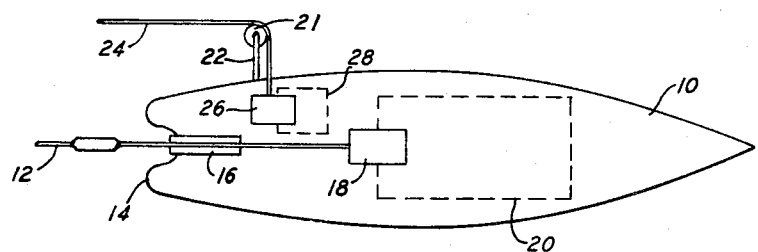
FIG. 1 is a perspective view of a ship laying cable with a taut wire payout system embodying features of the invention.

In FIG. 1 a cable-laying ship 10 slides cable 12 over its stern 14 by means of a cable chute 16. Suitable deck-mounted cable-handling means 18 guide the cable from a storage compartment 20 in the hold of the ship 10. Simultaneously, a pulley 21 on a boom 22 projecting from the hull of the ship 10 guides taut wire 24 overboard. Such a wire may for example be a .030 inch galvanized steel spring wire. The end of the wire 24 terminates at an anchoring position at the start of the path to be measured by the taut wire. Suitable pulley devices 26 guide the taut wire from a taut wire payout system 28 in the hold of the ship 10.

Laying the taut wire commences by drawing the wire from the payout system 28 over the guide 26 and the chute 22 and securing it to an anchor which is then submerged. After the ship has moved from tne anchor a distance sufficient to assure that the wire is being layed on the ocean bottom, the sheave 58 draws the wire taut. Then the anchor draws additional wire from a payout system 28 in the hold.

FIG. 2 illustrates the payout system 28. Here, two axles 30 and 32 tilt two spool-mounting platforms 34 and 36 toward each other into the payout position so that two spools of wire 38 and 40 resting on the respective platforms have their axes converge. The spools 38 and 40 hold between respective flanges 42, 44 and 46, 47 tightly wound coils 48 and 50 of .030 inch galvanized steel wire 24 in FIG. 1. Two arcuately-cut platform stops 52 and 54 on the opposing sides of the tilted platforms 34 and 36 restrain the flanges 44 and 47 and thereby hold the spools 38 and 40 in position. The platforms may be locked in either a horizontal loading position or tilted in the illustrated payout positions.

Movement of ship 10 draws the wire 24 from its coil 48 through an inverted bellmouth hopper 56 over a magnetic sheave 58, past a footage counter 62, and through an indicating tension measuring device 64 before passing it overboard by way of the pulley devices 26 and the boom 22. A voltage proportional to the taut wire speed is transmitted to suitable meters in the drum room and the ship's bridge. Typically, the sheave 58 permits the ship to pay out the wire with a tension of 35 to 40 pounds. As a result a finite tension exists at the ocean bottom.

Figure 3:
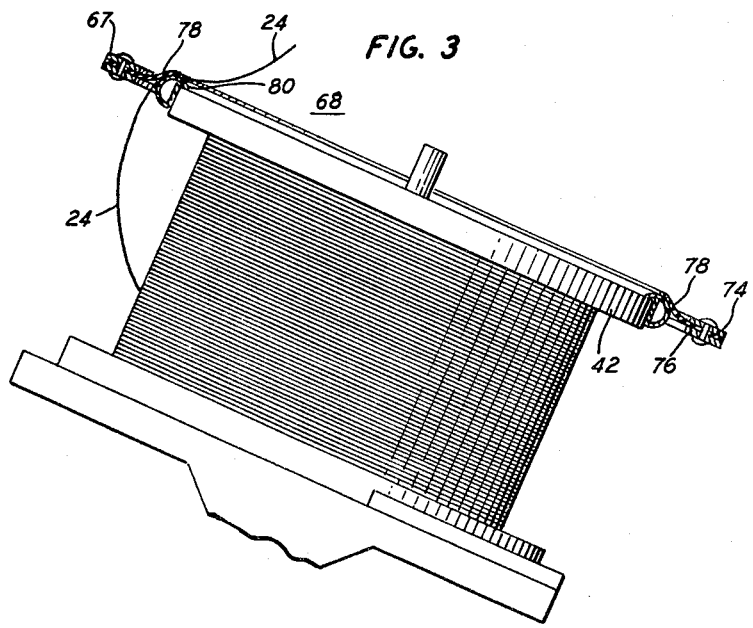
FIG. 3 is a sectional view 3—3 of FIG. 2.

A manual control device regulates the sheave 58. To prevent the wire 24 on coil 48 from uncoiling, the platform 34 possesses upstanding rods 66 at its four corners for guiding and holding the shoe 67 of a braking device 68. Similarly, the platform 36 possesses four upstanding rods 70 that guide the shoe 71 of an identical braking device 72. The braking device 68 is illustrated more completely in conjunction with FIG. 3.

In the shoe 67 of the braking device 68, two aluminum rings 74 and 76 sandwich between them a wider rubber ring 78 that projects inwardly beyond the rings 74 and 76. The rubber ring 78 rests on the outer toroidal surface of a toroidal chrome-plated steel rim 80 shaped to be mounted on the peripheral shoulder of the upper flange 42. Ears 82 (FIG. 2) peripherally projecting from the rings 74 and 76 are secured to the rods 66 so as to keep the ring 78 concentric with the rim 80 and to distort the ring 78 to press it against the rim 80 with a selected force. The ears 82 are held against the weight of the shoe 67 by stops 83 on the rods 66. The wire 24 passes from the coil 48 between the ring 78 and the surface of the rim 80 before passing through the hopper 56. The rubber ring 78 holds the wire 24 with a force of two to three pounds. When the wire 24 is drawn off the spool, the wire tends to move in a circular path about the rim. The force between the ring 78 and the rim 80, although small compared to the longitudinal force on he wire, is sufficient relative to the lateral component of that force to prevent the wire 24 from moving in a circular direction in response only to the springy uncoiling force within the wire 24 of the coil 48.

The wire of coil 48 is very springy. When left loose, or drawn directly through the hopper 56, its tendency would be to uncoil and lie about the base of the spool. The wire can thus tangle and kink as it is drawn through the hopper 56. The brakes 68 and 72 prevent this.

The bitter end 84 of the coil 48 connects to the leading end 86 of the coil 50 on the spool 40, but first passes between the ring 78 and the rim 80 on the platform 34. To prevent interference between the leading end 24 and the bitter end 84, the spool 38 is mounted so that the bitter end 84 always emerges from the coil 48 at the bottom. It then passes outside of the coil 48 and between the rim 80 and ring 78. Thus, while the wire 24, as it travels circularly, encounters the bitter end 84 it can pass by easily. When the wire of spool 38 is almost completely drawn off, the remaining turn of the coil 48 between the leading end and the bitter end 84 slips through between the ring 78 and the rim 80 and completely off the spool 38. No personnel or other attendants are necessary during this transfer. In the spool 40, the leading end 86 also passes between the rubber ring 78 and the spool-mounted rim 80 of the braking device 72. Similar to the coil 38, the bitter end 88 of the spool 40 passes from under the coil of the wire 50 outside the unwinding wire and between the ring 78 and rim 80. This bitter end connects to the leading end of the spool that must be loaded on the platform 34 in place of the spool 38 after the latter has become exhausted of wire. This assures continuous payout of wire.

In operation of this device, arrangements are first made for connecting the cable 12. Spools of wire 38 and 40 are then mounted on the platforms 34 and 36 in the horizontal loading position and tilted to the illustrated payout position. The spools are placed so that the bitter ends are at the bottoms of the wire coils. Workmen mount the rims 80 on the flanges 42 and 46. They place the leading end of wire 24 and the bitter end 84 on the rim 80 and drop the shoe 67 of braking device 68 so that its ears 82 ride on the rods 66 until the ring 78 rests on the rim 80. Simultaneously, the workmen press the wire 24 and the end 84 between the ring 78 and rim 80. The wire 24 is then threaded through the hopper 56, the magnetic sheave 58, the footage counter 62, the tension measuring device 64, the pulley device 26 and the pulley 21, until the wire is tied to the anchor.

The same procedure is followed in mounting the spool 40 with the braking device 72. The leading end 86 and the bitter end 88 are also arranged to pass between ring 78 and rim 80 before the shoe 71 is mounted. However, here the workmen secure the leading end 86 to the bitter end 84.

As the ship moves, the sheave 58 draws the wire taut. It also permits wire 24 to be pulled from the spool 38. The wire advances longitudinally but also travels circularly from the coil 48 without, however, uncoiling of its own springiness. When sufficient wire is drawn off the spool 38 and the remaining bight of wire drawn from under the braking device 68, the wire of coil 50 beginning automatically with the leading end 86 is drawn from the spool 40.

Workmen now tilt the platform 34 in its opposite direction, remove the braking device 68 from the rods and slide the spool 38 off the platform. A new spool is now placed on the platform and the latter tilted to the direction shown. By arranging the leading and bitter ends of the wire on the spool after placing the rim 80 on the flange at the top of the spool, the remainder of the braking device 68 can be dropped on the rod 66 to hold the leading and bitter ends of the wire. The leading end of the new spool is then secured to the bitter end 88 of the now-operating spool.

By virtue of the invention kinking and entangling which results from uncoiling by the springiness of the wire is avoided. Since wire with reasonable strength and small diameter is inherently springy, such difficulties are generally encountered and must be avoided.

While an embodiment of the invention has been described in detail, it will be obvious to those skilled in the art that the invention may be embodied otherwise without departing from its spirit and scope.

What is claimed is:

1. A payout system for springy wire comprising, a spool about which the wire is wound, pulling means located axially with respect to said spool for drawing wire off said spool whereby the wire as it leaves the spool travels circularly, braking means for restricting the speed at which the unwinding wire travels circularly, said braking means including two resiliently engaging surfaces at one end of the spool embracing between them the wire leaving the spool and forming a frictional annular path for said wire, whereby the uncoiling of said spool due to springiness of said wire is prevented, one of said surfaces forming the rim of a flange at the end of said spool, the other of said surfaces forming part of a resilient ring pressing against said flange, said ring lying against said rim, and holding means pressing said ring against said rim.

2. A payout system as in claim 1 wherein said wire on said spool has a bitter end and wherein said surfaces embrace the bitter end.

3. A payout system as in claim 2, further comprising a second spool of wire, said second spool being aligned axially with said pulling means, second braking means for restricting the speed at which wire on the spool circles the spool when it is drawn off from an axial direction, said second braking means including a second pair of resiliently engaging surfaces forming a frictional annular path.

4. A payout system as in claim 1 wherein said spool is mounted on a tilting platform, and wherein said platform includes guide means for controlling the position of said holding means.

5. A payout system as in claim 1 wherein said weight means include two metal rings sandwiching the outer edges of said resilient ring.

6. A payout system as in claim 4 wherein said spool is mounted on a tilting platform and wherein said platform includes rods projecting through openings in said metal rings for guiding their position, the wire on said second spool having a leading end and a bitter end, both of said last mentioned ends being embraced by said surfaces, said leading end of said second spool of wire being connected to the bitter end of the wire in said first spool.

7. A shipboard system for measuring ground speed comprising means for guiding wire overboard, a footage counter for said wire, means aboard the ship for holding wire taut, a pair of tilted platforms, a pair of wire spools mounted on said platforms with axial projections meeting at an intersection, wire direction control means at said intersection, respective coils of springy wire wound about said two spools, said wire coils having respective leading ends and bitter ends; said leading end of one of said spools passing over said flange on said spool through said wire direction control means, said means for holding wire taut, said footage counter, said means for guiding wire overboard and off the ship; braking means for restricting the speed at which the leading end of said wire from said one spool circles the spool as it is being drawn off said one spool, said braking means including resiliently engaging surfaces embracing between them the leading end of said wire from the one of said spools and forming an annular frictional path for the wire, the bitter end of said wire on the one of said spools projecting from the end of the spool opposite the wire direction control means and passing between said surfaces while joining the leading end of the wire on the other of said spools, the bitter end of the wire on the other of said spools projecting from the end opposite the wire direction control means, and second braking means for restricting the speed at which the wire circles the spool, said second braking means including two resiliently engaging surfaces embracing between them both ends of the wire on the other of said spools and forming an annular frictional path for the wire.

References Cited

UNITED STATES PATENTS

| | | | |
|---|---|---|---|
| 2,425,525 | 8/1947 | Franz | 242—128 |
| 2,349,873 | 5/1944 | Lisy | 242—128 |

LEONARD D. CHRISTIAN, *Primary Examiner.*